United States Patent
Buma et al.

(10) Patent No.: US 7,129,659 B2
(45) Date of Patent: Oct. 31, 2006

(54) STABILIZER APPARATUS FOR VEHICLE

(75) Inventors: Shuuichi Buma, Toyota (JP); Jaesung Cho, Toyota (JP); Yoshiyuki Yasui, Nagoya (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 11/116,264

(22) Filed: Apr. 28, 2005

(65) Prior Publication Data

US 2005/0264247 A1 Dec. 1, 2005

(30) Foreign Application Priority Data

May 26, 2004 (JP) ............................. 2004-155872

(51) Int. Cl.
*H02P 7/00* (2006.01)

(52) U.S. Cl. ............ 318/432; 318/434; 318/798; 318/799; 180/400; 180/408; 180/412; 280/29; 280/206

(58) Field of Classification Search ............ None
See application file for complete search history.

(56) References Cited

U.S. PATENT DOCUMENTS

| | | | |
|---|---|---|---|
| 6,022,030 A * | 2/2000 | Fehring | 280/5.511 |
| 6,046,560 A * | 4/2000 | Lu et al. | 318/432 |
| 6,107,767 A * | 8/2000 | Lu et al. | 318/561 |
| 6,425,585 B1 * | 7/2002 | Schuelke et al. | 280/5.511 |
| 6,448,724 B1 * | 9/2002 | Kleinau et al. | 318/254 |
| 6,550,788 B1 * | 4/2003 | Schmidt et al. | 280/5.511 |
| 6,874,792 B1 * | 4/2005 | Vortmeyer et al. | 280/5.511 |
| 2005/0179220 A1 * | 8/2005 | Yasui et al. | 280/5.506 |

FOREIGN PATENT DOCUMENTS

DE 102 42 552 A1 3/2004
JP A 2002-518245 6/2002

* cited by examiner

*Primary Examiner*—Lincoln Donovan
*Assistant Examiner*—Erick Glass
(74) *Attorney, Agent, or Firm*—Oliff & Berridge, PLC (57) ABSTRACT

In a stabilizer apparatus for a vehicle, an electronic control unit calculates a target current of an electric motor from vehicle speed, steering angle, and lateral acceleration, and increases and decreases actual current such that the calculated target current flows through the motor. The control unit decreases the actual current by a predetermined amount when the difference between the target current and the actual current becomes smaller than a predetermined value during control of increasing the actual current. The predetermined amount is equal to the difference between the determined target current at the time of the detection of the difference and current which is necessary to obtain, during control of decreasing the actual current, an output torque equal to the output torque of the speed reduction mechanism obtained as a result of the target current flowing through the electric motor.

7 Claims, 4 Drawing Sheets

STABILIZER APPARATUS FOR VEHICLE

BACKGROUND OF THE INVENTION

1. Field of the Invention

The present invention relates to a stabilizer apparatus for a vehicle which can change the torsional stiffness of a stabilizer.

2. Description of the Related Art

Japanese Kohyo (PCT) Patent Publication No. 2002-518245 discloses a conventional vehicle stabilizer apparatus including a motor-driven actuator which comprises an electric motor and a speed reduction mechanism and is disposed between two sections of a divided stabilizer so as to rotate one section of the stabilizer in relation to the other section thereof about an axis of the stabilizer. In the stabilizer apparatus, a target current which must flow through the electric motor so as to suppress a roll of the vehicle is determined, and the current flowing through the electric motor is increased or decreased such that the determined target current flows through the electric motor.

In the conventional apparatus, the output torque of the speed reduction mechanism increases at a certain gradient (regular efficiency) with the increasing current flowing through the electric motor. However, when the current flowing through the electric motor is gradually reduced in this state, the output torque of the speed reduction mechanism does not decrease immediately to follow the decreasing current, because the electric motor remains in a stopped state (locked state) because of friction of the speed reduction mechanism or the like, whereby the output torque is maintained at the increased level. After that, when the current flowing through the electric motor decreases to a certain level, because of restoration force generated by the stabilizer, the output torque starts to decrease at a certain gradient (reverse efficiency) to follow the decreasing current flowing through the electric motor. As described above, a delay time is present between a point in time when the output torque has reached a certain level and a point in time when the output torque starts to decrease to follow the decreasing current flowing through the electric motor. Therefore, the output torque of the speed reduction mechanism fails to follow the current flowing through the electric motor, with a resultant deterioration in responsiveness.

SUMMARY OF THE INVENTION

In view of the foregoing problem, an object of the present invention is to provide a stabilizer apparatus for a vehicle which can improve the responsiveness of output torque of a motor-driven actuator to current flowing through an electric motor during periods in which the current decreases.

In order to achieve the above-described object, the present invention provides a stabilizer apparatus for a vehicle comprising a divided stabilizer having two sections; a motor-driven actuator composed of an electric motor and a speed reduction mechanism and disposed between the two sections of the stabilizer so as to rotate one section of the stabilizer in relation to the other section thereof about an axis of the stabilizer; target current determination means for determining a target current which must flow through the electric motor in order to suppress rolling of the vehicle; current control means for increasing and decreasing the current flowing through the electric motor such that the determined target current flows through the electric motor; increase control end detection means for detecting the end of control of increasing the current flowing through the electric motor; and current decreasing control means for decreasing the current flowing through the electric motor by a predetermined amount in response to detection of the end of the current increasing control by the increase control end detection means.

In this case, the increase control end detection means may include actual current detection means for detecting actual current flowing through the electric motor; and current coincidence detection means for detecting that a difference between the determined target current and the detected actual current becomes smaller than a predetermined value when the control of increasing the current flowing through the electric motor is performed.

The predetermined amount is equal to the difference between the determined target current at the time of the detection of the end of the current increasing control by the increase control end detection means and current which is necessary to obtain, during control of decreasing the current flowing through the electric motor, an output torque equal to the output torque of the speed reduction mechanism obtained as a result of the determined target current flowing through the electric motor.

When the end of the control of increasing the current flowing through the electric motor is detected, the current flowing through the electric motor is reduced by a predetermined amount. This operation shortens or eliminates the delay time between a point in time when the output torque of the motor-driven actuator has reached to a predetermined level and a point in time when the output torque starts to decrease to follow the decreasing current flowing through the electric motor. Therefore, when the output torque of the motor-driven actuator is controlled to decrease, the output torque of the motor-driven actuator reliably follows the current flowing through the electric motor, whereby the responsiveness can be improved.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
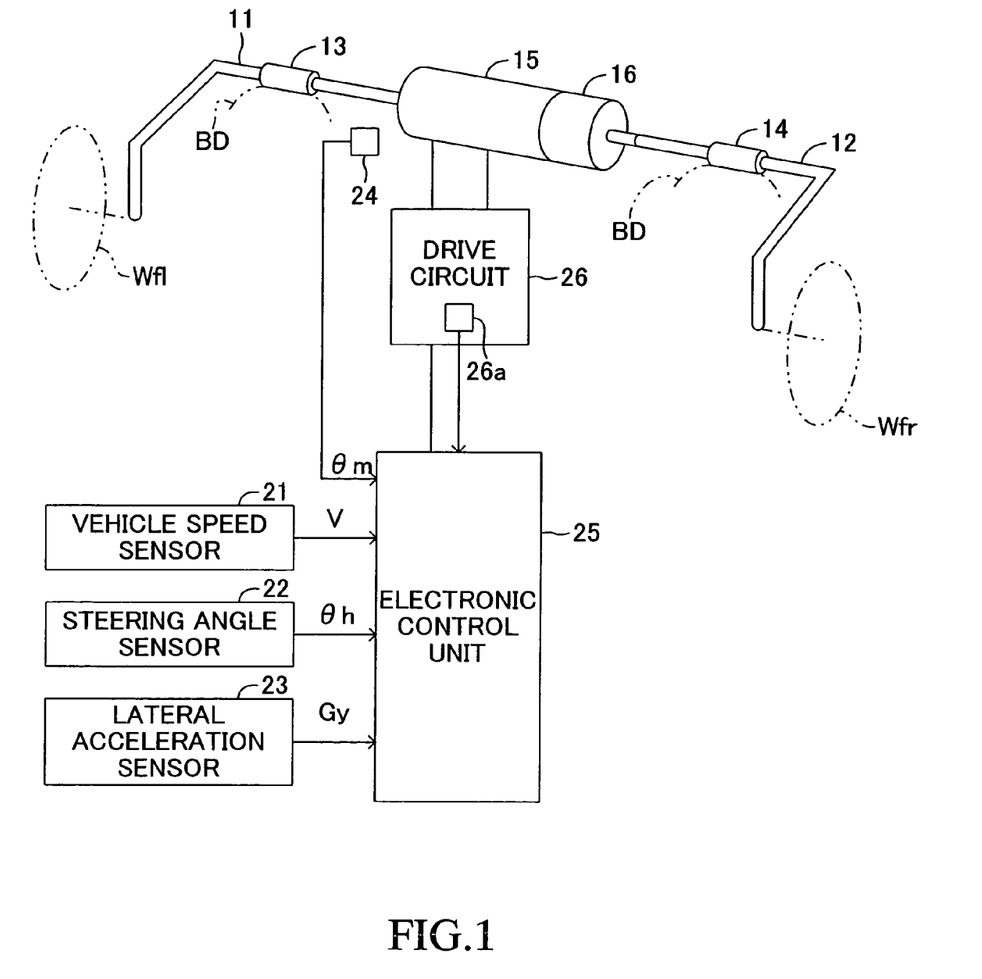
FIG. 1 is an overall schematic view of a stabilizer apparatus for a vehicle according to an embodiment of the present invention.

One embodiment of the present invention will next be described with reference to the drawings. FIG. 1 is an overall schematic view showing the case where the stabilizer apparatus according to the present invention is applied to the front wheels of a vehicle.

This stabilizer apparatus includes two separated stabilizer members 11 and 12. These stabilizer members 11 and 12 are connected at their outer ends to left and right front wheels Wfl and Wfr, respectively, via wheel side members. Intermediate portions of the stabilizer members 11 and 12 are supported on a vehicle body BD via bearings 13 and 14, respectively, such that the stabilizer members 11 and 12 are rotatable about the axis.

A motor-driven actuator composed of an electric motor 15 and a speed reduction mechanism 16 is interposed between the stabilizer members 11 and 12. An inner end of the stabilizer member 11 is connected to the stator of the electric motor 15, and an inner end of the stabilizer member 12 is connected to the output shaft of the speed reduction mechanism 16. This configuration enables the electric motor 15 to rotate the stabilizer member 12, in relation to the stabilizer member 11, about the axis. Notably, the speed reduction mechanism 16 is designed such that the output shaft of the speed reduction mechanism 16 rotates in a direction opposite the rotational direction of the electric motor 15. For example, when the vehicle body BD rolls to the right, in order to suppress the roll, the stabilizer member 12 is rotated in the counterclockwise direction in FIG. 1 so that the distance between the vehicle body BD and the right front wheel Wfr increases. In this case, the electric motor 15 is driven to rotate in the clockwise direction in FIG. 1; i.e., in the regular direction, in order to rotate the output shaft of the speed reduction mechanism 16 in the counterclockwise direction in FIG. 1; i.e., in the reverse direction. Meanwhile, when the vehicle body BD rolls to the left, in order to suppress the roll, the stabilizer member 12 is rotated in the clockwise direction in FIG. 1 so that the distance between the vehicle body BD and the right front wheel Wfr decreases. In this case, the electric motor 15 is driven to rotate in the counterclockwise direction in FIG. 1; i.e., in the reverse direction, in order to rotate the output shaft of the speed reduction mechanism 16 in the clockwise direction in FIG. 1; i.e., in the regular direction.

The stabilizer apparatus further includes an electric control circuit-which is composed of a vehicle speed sensor 21, a steering angle sensor 22, a lateral acceleration sensor 23, a motor rotational angle sensor 24, an electronic control unit 25, and a drive circuit 26. The vehicle speed sensor 21 detects vehicle speed V. The steering angle sensor 22 detects a steering angle $\theta h$ of a steering wheel. When the steering angle $\theta h$ detected by means of the steering angle sensor 22 is zero, the steering wheel is located at the neutral position. When the steering angle $\theta h$ is positive, the steering angle represents an operation amount of the steering wheel in the counterclockwise direction. When the steering angle $\theta h$ is negative, the steering angle represents an operation amount of the steering wheel in the clockwise direction. The lateral acceleration sensor 23 detects lateral acceleration Gy of the vehicle along the left-right direction of the vehicle. When the lateral acceleration Gy detected by means of the lateral acceleration sensor 23 is positive, a rightward acceleration is produced in the vehicle body. When the lateral acceleration Gy is negative, a leftward acceleration is produced in the vehicle body. The motor rotational angle sensor 24 is constituted by, for example, a rotary encoder, and detects rotational angle $\theta m$ of the rotor of the electric motor 15.

The electronic control unit 25 is formed from a microcomputer, which includes, as main components, a CPU, ROM, and RAM. This electronic control unit 25 repeatedly executes a current increase-decrease control program of FIG 2 at predetermined short intervals, to thereby drive the electric motor 15 via the drive circuit 26. The drive circuit 26 controls current flowing through the electric motor 15 in accordance with an instruction from the electronic control unit 25. The drive circuit 26 includes an actual current detection sensor 26a which detects actual current Im through the electric motor 15 and outputs to the electronic control unit 25 a signal indicative of the detected actual current Im. Notably, the polarity of the actual current Im represents the direction of current flowing through the electric motor 15. That is, when the actual current Im is positive, current flows through the electric motor 15 in such a direction that the electric motor 15 rotates in the regular direction. When the actual current Im is negative, current flows through the electric motor 15 in such a direction that the electric motor 15 rotates in the reverse direction.

Next, operation of the embodiment having the above-described configuration will be described. The electronic control unit 25 repeatedly executes the current increase-decrease control program of FIG. 2 at predetermined short intervals. The electronic control unit 25 starts the current increase-decrease control program from step S10. In step S12, the electronic control unit 25 acquires the vehicle speed V detected by means of the vehicle speed sensor 21, the steering angle $\theta h$ detected by means of the steering angle sensor 22, the lateral acceleration Gy of the vehicle detected by means of the lateral acceleration sensor 23, the rotational angle $\theta m$ of the rotor of the electric motor 15 detected by means of the motor rotational angle sensor 24, and the actual current Im detected by means of the actual current detection sensor 26a.

Figure 2:
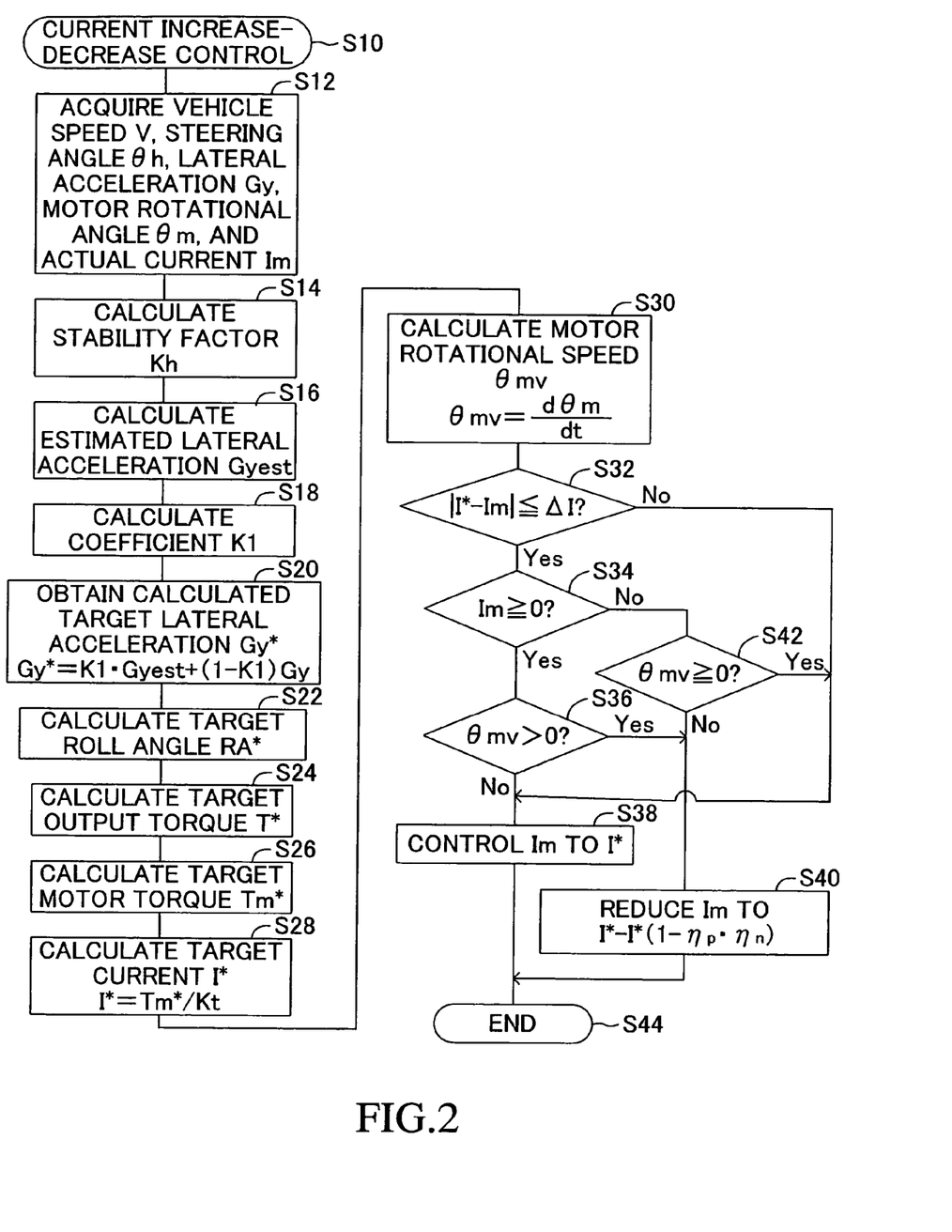
FIG. 2 is a flowchart of a current increase-decrease control program executed by an electronic control unit of FIG. 1.

First, the case where the vehicle travels straight on a flat road surface will be described. In this case, as will be described later in more detail, the steering angle $\theta h$, the lateral acceleration Gy, and the actual current Im flowing through the electric motor 15, acquired in step S12, are substantially zero. Therefore, estimated lateral acceleration Gyest calculated in step S16, calculated target lateral acceleration Gy* obtained in step S20, and target current I* which is calculated in step S28 and is caused to flow through the electric motor 15 become substantially zero. Therefore, the electronic control unit 25 makes a "Yes" determination in steps S32 and S34, and a "No" determination in step S36. Therefore, the electronic control unit 25 proceeds to step S38 so as to control the electric motor 15 such that the actual current Im becomes equal to the target current I*; i.e., zero. That is, the electronic control unit 25 ends current execution of this program in step S44, without operating the electric motor 15.

Figure 3:
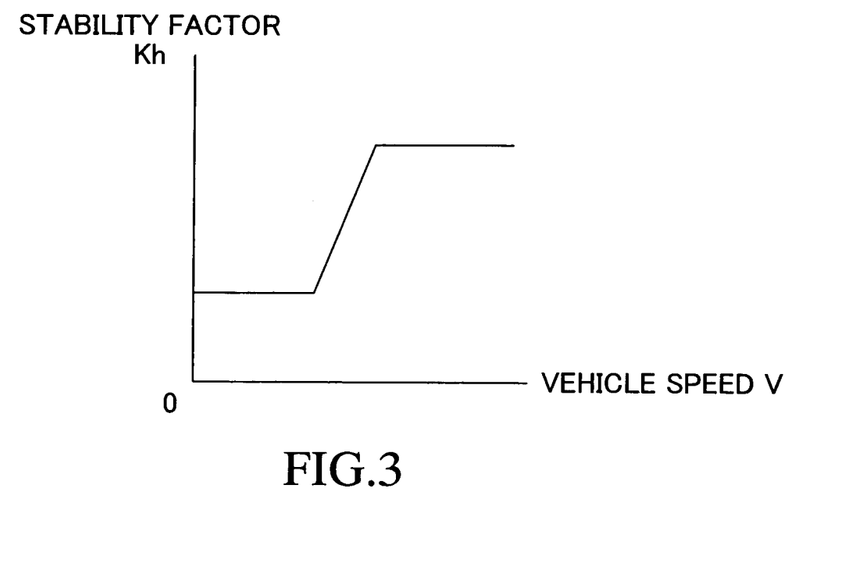
FIG. 3 is a graph showing the characteristic of change in stability factor with vehicle speed, the characteristic being stored in a stability factor table provided in the electronic control unit.

Next, the case where the vehicle turns leftward in the state in which the vehicle travels straight will be described. In this case, after performing the processing of step S12 in the same manner as in the above-described case, the electronic control unit 25 proceeds to step S14 so as to calculate a stability factor Kh on the basis of the vehicle speed V acquired in step S12 and with reference to a stability factor table provided in the ROM of the electronic control unit 25. As shown in FIG. 3, the stability factor table stores the stability factor Kh which changes with the vehicle speed V and represents the degree of steering stability. The stability factor Kh is maintained at a constant value when the vehicle speed V is not greater than a first predetermined speed (low speed region), increases in proportion to an increase in the vehicle speed V when the vehicle speed V exceeds the predetermined vehicle speed (intermediate speed region), and is maintained at a constant value when the vehicle speed V exceeds a second speed higher than the first speed (high speed region). After the processing of step S14, the electronic control unit 25 proceeds to step S16 so as to calculate an estimated lateral acceleration Gyest from the vehicle speed V and the steering angle θh acquired in step S12 and the stability factor Kh calculated in step S14. The estimated lateral acceleration Gyest is presented by the following Eq. (1):

$$Gyest=\theta h \cdot V^2 \cdot \{1/(Kh \cdot V^2+1)\} \cdot (1/L) \cdot (1/Rs) \quad (1)$$

wherein L is a constant representing the wheel base, and Rs is a constant representing a neutral steering gear ratio.

Figure 4:
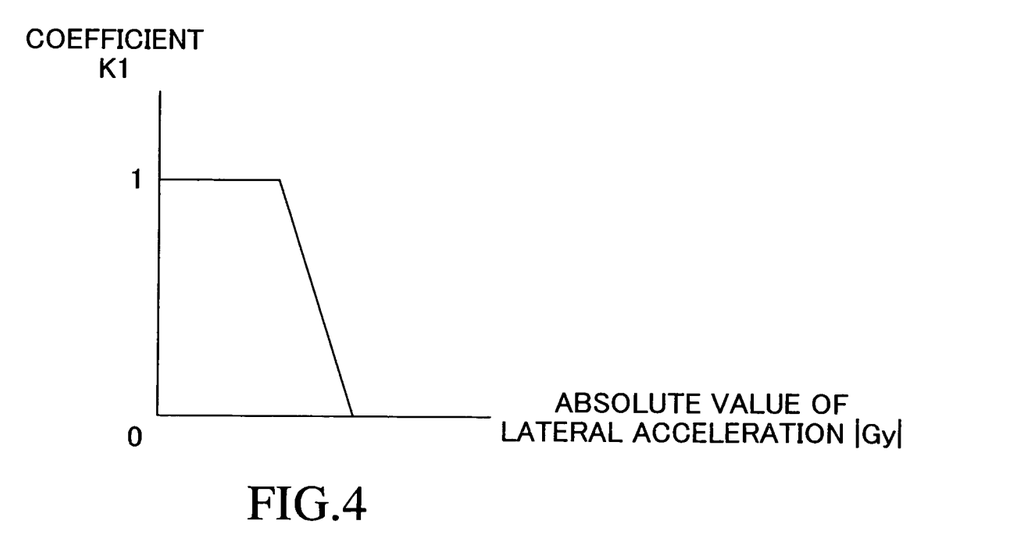
FIG. 4 is a graph showing the characteristic of change in value of a coefficient with the absolute value of lateral acceleration, the characteristic being stored in a coefficient table provided in the electronic control unit.

Next, in step S18, the electronic control unit 25 calculates a coefficient K1 on the basis of the absolute value |Gy| of the lateral acceleration Gy acquired in step S12 and with reference to a coefficient table provided in the ROM of the electronic control unit 25. As shown in FIG. 4, the coefficient table stores the coefficient K1 which changes with the absolute value |Gy| of the lateral acceleration Gy and is used in calculation of Eq. (2) to be described below. The coefficient K1 is maintained at 1 when the absolute value |Gy| of the lateral acceleration Gy is not greater than a predetermined value. When the absolute value |Gy| of the lateral acceleration Gy exceeds the predetermined value, the coefficient K1 decreases from 1 to 0 in proportion to an increase in the absolute value |Gy|. When the absolute value |Gy| increases further, the coefficient K1 is maintained at 0. After the processing of step S18, the electronic control unit 25 proceeds to step S20 so as to combine the lateral acceleration Gy acquired in step S12 and the estimated lateral acceleration Gyest calculated in step S16, while weighting them by reference to the coefficient K1 calculated in step S18 to thereby obtain a calculated target lateral acceleration Gy*. The calculated target lateral acceleration Gy* is represented by the following Eq. (2).

$$Gy^* = K1 \cdot Gyest + (1-K1)Gy \quad (2)$$

Figure 5:
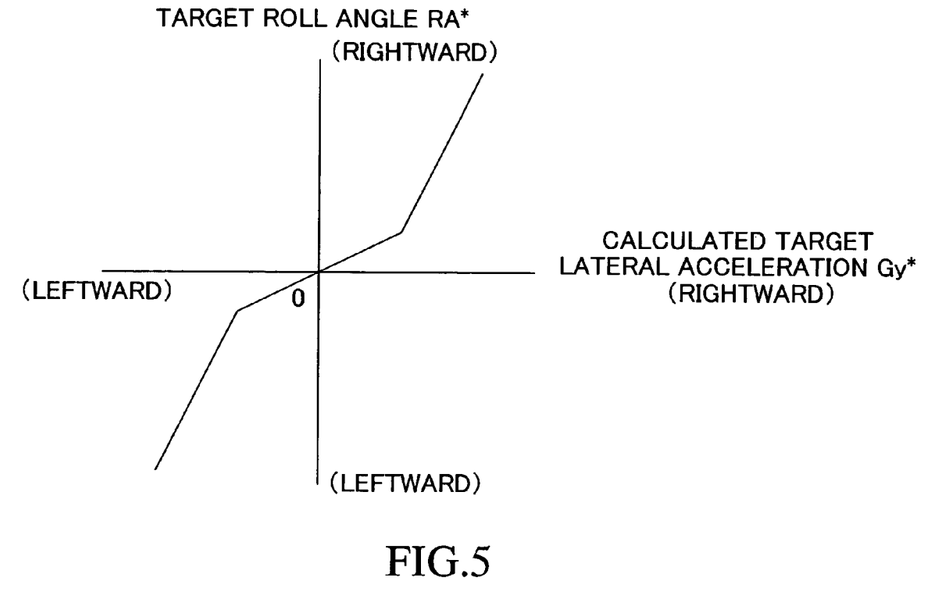
FIG. 5 is a graph showing the characteristic of change in target roll angle with calculated target lateral acceleration, the characteristic being stored in a roll angle table provided in the electronic control unit.

Next, in step 22, the electronic control unit 25 calculates a target roll angle RA* on the basis of the calculated target lateral acceleration Gy* and with reference to a roll angle table provided in the ROM of the electronic control unit 25. As shown in FIG. 5, the roll angle table stores a variation in the target roll angle RA* which increases when the calculated target lateral acceleration Gy* increases from 0 to a predetermined positive value, and a variation in the target roll angle RA* which decreases when the calculated target lateral acceleration Gy* decreases from 0 to a predetermined negative value. The sign of the target roll angle RA* represents the rolling direction of the vehicle body BD. Specifically, when the target roll angle RA* is positive, the vehicle body BD rolls rightward, and when the target roll angle RA* is negative, the vehicle body BD rolls leftward. At the present point in time, since the vehicle is turning to the left, the vehicle body BD is in a rightward rolling state. Therefore, both the calculated target lateral acceleration Gy* and the target roll angle RA* become positive.

Next, in step S24, the electronic control unit 25 calculates a target output torque T* of the speed reduction mechanism 16. Specifically, on the basis of the calculated target lateral acceleration Gy*, the electronic control unit 25 first calculates a roll moment about a fore-aft axis of the vehicle which satisfies the calculated target roll angle RA*. Subsequently, the electronic control unit 25 corrects the roll moment by, for example, subtracting therefrom a roll moment generated by a suspension spring, to thereby calculate a roll moment share of the stabilizer apparatus. Finally, the electronic control unit 25 calculates the target output torque T* of the speed reduction mechanism 16 from the roll moment share of the stabilizer apparatus in consideration of the geometric configuration of the stabilizer members 11 and 12; e.g., the arm length as measured along the fore-aft direction of the vehicle and the state of attachment.

Next, in step S26, the electronic control unit 25 calculates a target motor torque Tm* from the calculated target output torque T* in consideration of the speed reduction characteristics; e.g., the speed reduction ratio and efficiency, of the speed reduction mechanism 16. After the processing of step S26, the electronic control unit 25 proceeds to step S28 so as to calculate a target current I* of the electric motor 15 by dividing the calculated target motor torque Tm* by a coefficient Kt (torque constant). In this case, since the vehicle body BD is in a rightward rolling state, in order to suppress this roll, the electronic control unit 25 drives the electric motor 15 such that the positive target current I* flows through the electric motor 15 and thus the electric motor 15 rotates in the regular direction.

Subsequently, in step S30, the electronic control unit 25 differentiates the motor rotational angle θm acquired in step S12 to thereby obtain a motor rotational speed θmv. Notably, the sign of the motor rotational speed θmv represents the rotational direction of the electric motor 15. That is, when the motor rotational speed θmv is positive, the electric motor 15 rotates in the regular rotational direction, and when the motor rotational speed θmv is negative, the electric motor 15 rotates in the reverse rotational direction.

Next, in step S32, the electronic control unit 25 determines whether the absolute value of the difference between the calculated target current I* and the detected actual current Im (=|I*−Im|) becomes equal to or less than a predetermined value ΔI. This predetermined value ΔI is set to a very small value so as to determine that the actual current Im has approached and become substantially equal to the target current I*. When the actual current Im has not yet become equal to the target current I* after the target current I* had increased as a result of an increase in the calculated target lateral acceleration Gy*, the electronic control unit 25 makes a "No" determination in step S32, and then proceeds to step S38 so as to rotate the electric motor 15 in the regular direction such that the actual current Im becomes equal to the target current I*. After the processing of step S38, the electronic control unit 25 proceeds to step S44 so as to end the current execution of the present program. After that, in steps S12 to S28, the target current I* is newly calculated in accordance with the rolling state of the vehicle, and when the absolute value of the difference between the newly calculated target current I* and the actual current Im(=|I*−Im|) is greater than the predetermined value ΔI, the processing of step S32 and the processing of S38 are repeatedly performed, whereby the rightward rolling of the vehicle body BD is suppressed.

When the electronic control unit 25 makes a "Yes" determination in step S32 in this state; i.e., determines that the absolute value of the difference between the target current I* and the actual current Im(=|I*−Im|) has become equal to or less than the predetermined value ΔI, the electronic control unit 25 performs the processing of step S34 and subsequent steps. In step S34, the electronic control unit 25 determines whether the actual current Im is positive or negative. In step 36, the electronic control unit 25 determines whether the motor rotational angle speed θmv is positive or negative. In this case, in order to suppress the rightward rolling of the vehicle body BD, the regular rotation of the electric motor 15 has been continued, while the positive actual current Im has been increased. Therefore, the electronic control unit 25 makes a "Yes" determination in S34 and S36, and then performs the processing of step S40.

Figure 6:
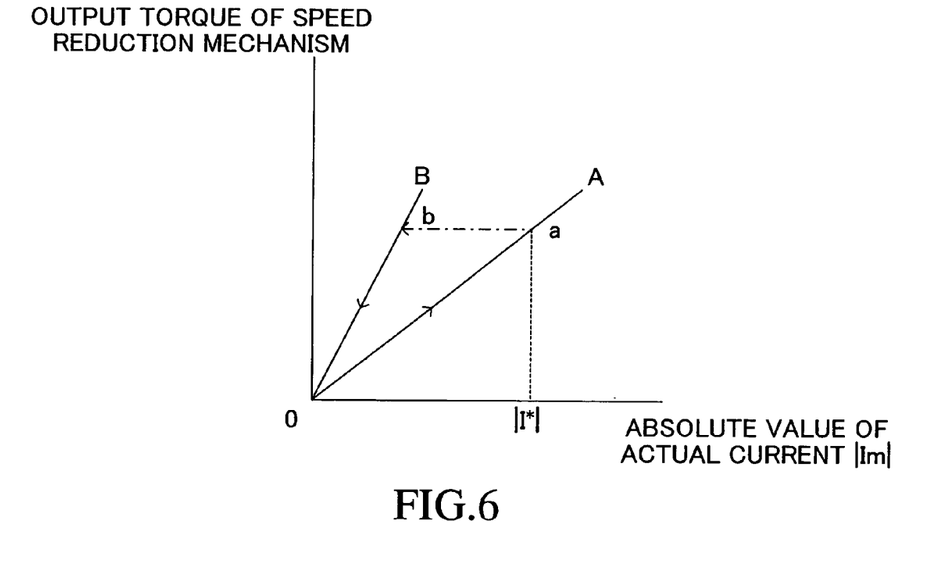
FIG. 6 is a graph used for describing the characteristic of change in output torque of the speed reduction mechanism vs. absolute value of actual current flowing through the electric motor.

In step S40, the electronic control unit 25 performs current decreasing control so as to decrease the actual current Im to a current calculated by I*−I*(1−ηp·ηn). Here, ηp represents the slope of a line OA shown in FIG. 6 and representing the relation between actual current Im and the output torque of the speed reduction mechanism 16; i.e., the regular efficiency of the output torque of the speed reduction mechanism 16 with respect to the actual current Im, during control of increasing the actual current Im; and ηn represents the slope of a line BO shown in FIG. 6 and representing the relation between actual current Im and the output torque of the speed reduction mechanism 16; i.e., the reverse efficiency of the actual current Im with respect to the output torque of the speed reduction mechanism 16, during control of decreasing the actual current Im. Further, I*(1−ηp·ηn) represents a predetermined quantity of current corresponding to, for example, the difference between points a and b shown in FIG. 6. The quantity of current is equal to the difference between the determined target current I* (e.g., point a on the line OA) at the time of detection in the above-described step S32 and current (e.g., point b on the line BO) which is necessary for obtaining, during control of decreasing the actual current Im, an output torque equal to the output torque of the speed reduction mechanism 16 obtained when the target current I* flows through the electric motor 15.

As described above, when the electronic control unit 25 makes a "Yes" determination in steps S32, S34, and S36, the current flowing through the electric motor 15 is reduced from the target current I* by the predetermined current quantity (=I*(1−ηp·ηn)). Accordingly, no delay time is present between a point in time when the output torque of the speed reduction mechanism 16 has reached a predetermined level and a point in time when the output torque of the speed reduction mechanism 16 starts to decrease to follow the decreasing current flowing through the electric motor 15. Therefore, when the output torque of the speed reduction mechanism 16 is controlled to decrease, the output torque of the speed reduction mechanism 16 reliably follows the current flowing through the electric motor 15, whereby the responsiveness of the motor-driven actuator is improved.

Meanwhile, even when the electronic control unit 25 makes a "Yes" determination in steps S32 and S34, the electronic control unit 25 makes a "No" determination in step S36, for example, in the case where the stabilizer member 12 and the output shaft of the speed reduction mechanism 16 are rotated clockwise as a result of the right front wheel Wfr having run over an article in the road, so that the electric motor 15 is rotated in reverse, or the case in which the output torque of the speed reduction mechanism 16 balances with the torsional force of the stabilizer member 12, so that the electric motor 15 temporarily stops. In such a case, the electronic control unit 25 performs the processing of step S38. That is, the actual current Im is controlled to become equal to the target current I* to thereby maintain the operation of the electric motor 15, because of the following reason. In a period during which the actual current Im is controlled to increase, the electric motor 15 is generally in the regular rotation state. Therefore, in the case where the electric motor 15 is rotated in reverse or stopped, controlling the actual current Im to the target current I* is considered to be preferable from the viewpoint of travel stability.

Next, the case where the vehicle turns rightward in the state in which the vehicle travels straight will be described. In this case, the processing of steps S12 to S30 is performed in the same manner as in the above-described case. Since the vehicle is turning to the right, the vehicle body BD is in a leftward rolling state. Therefore, both the calculated target lateral acceleration Gy* and the target roll angle RA* become negative. In order to suppress this roll, the electronic control unit 25 drives the electric motor 15 such that the negative target current I* flows through the electric motor 15 and thus the electric motor 15 rotates in the reverse direction.

When the electronic control unit 25 makes a "No" determination in step S32; i.e., determines that the absolute value of the difference between the target current I* and the detected actual current Im(=|I*−Im|) is greater than the predetermined value ΔI because the actual current Im has not yet reached the target current I*, the electronic control unit 25 proceeds to step S38 so as to rotate the electric motor 15 in the reverse direction such that the actual current Im becomes equal to the target current I*. After that, in steps S12 to S28, the target current I* is newly calculated in accordance with the state of leftward rolling of the vehicle, and when the absolute value of the difference between the newly calculated target current I* and the actual current Im(=|I*−Im|) is greater than the predetermined value ΔI, the processing of step S32 and the processing of S38 are repeatedly performed, whereby the leftward rolling of the vehicle body BD is suppressed.

When the electronic control unit 25 makes a "Yes" determination in step S32 in this state; i.e., determines that the absolute value of the difference between the target current I* and the actual current Im(=|I*−Im|) has become equal to or less than the predetermined value ΔI, the electronic control unit 25 performs the processing of step S34 and subsequent steps. In this case, in contrast to the above-described case, in order to suppress the leftward rolling of the vehicle body BD, the reverse rotation of the electric motor 15 has been continued, while the negative actual current Im has been decreased. Therefore, the electronic control unit 25 makes a "No" determination in S34 and S42, and then performs the processing of step S40.

In this case as well, by virtue of the processing of step S40, the current flowing through the electric motor 15 is increased from the target current I* by the predetermined current quantity (=I*(1−ηp·ηn)). In this case, however, the target current I* is negative, the magnitude (absolute value) of the current flowing through the electric motor 15 is reduced as in the above-described case where the vehicle turns to the left. Accordingly, no delay time is present between a point in time when the output torque of the speed reduction mechanism 16 has reached a predetermined level and a point in time when the output torque of the speed reduction mechanism 16 starts to decrease to follow the decreasing current flowing through the electric motor 15. Therefore, the output torque of the speed reduction mechanism 16 reliably follows the current flowing through the electric motor 15, whereby the responsiveness of the motor-driven actuator is improved.

Meanwhile, even when the electronic control unit 25 makes a "Yes" determination in step S32 and a "No" determination in step S34, as in the case of the above-described step S36, the electronic control unit 25 makes a "Yes" determination in step S42, for example, in the case where the stabilizer member 12 is rotated counterclockwise in relation to the stabilizer member 11 as a result of the left front wheel Wfl having run over an article in the road, so that the electric motor 15 is rotated in the regular direction, or the case where the electric motor 15 temporarily stops as in the above-described case. In such a case, the electronic control unit 25 proceeds to step S38 so as to control the actual current Im such that the actual current Im becomes equal to the target current I* to thereby maintain the operation of the electric motor 15.

Next, there will be described a case where the vehicle body BD rolls rightward as a result of, for example, the left front wheel Wfl having run over an article in the road, while the vehicle travels straight. In this case, as in the above-described case where the vehicle body BD rolls rightward because of a left turn of the vehicle, after the processing of steps S12 to S30, the electronic control unit 25 performs the processing of steps S32 to S40. As a result, the rightward rolling of the vehicle body BD is suppressed, and the output torque of the speed reduction mechanism 16 reliably follows the current flowing through the electric motor 15, whereby responsiveness is improved.

Next, there will be described a case where the vehicle body BD rolls leftward as a result of, for example, the right front wheel Wfr having run over an article in the road, while the vehicle travels straight. In this case, as in the above-described case where the vehicle body BD rolls leftward because of a right turn of the vehicle, after the processing of steps S12 to S30, the electronic control unit 25 performs the processing of steps S32, S34, S42, S38, and S40. As a result, the leftward rolling of the vehicle body BD is suppressed, and the output torque of the speed reduction mechanism 16 reliably follows the current flowing through the electric motor 15, whereby responsiveness is improved.

Although one embodiment of the present invention has been described above, the present invention is not limited to the embodiment, and may be modified in various manners without departing from the scope of the present invention.

In the above-described embodiment, the stabilizer apparatus of the present invention is applied to the front wheels of a vehicle. However, the stabilizer apparatus of the present invention can be applied to the rear wheels of a vehicle.

In the above-described embodiment, the calculated target lateral acceleration Gy* is obtained from the vehicle speed V detected by the vehicle speed sensor 21, the steering angle θh detected by the steering angle sensor 22, and the lateral acceleration Gy of the vehicle detected by the lateral acceleration sensor 23. However, the calculated target lateral acceleration Gy* may be obtained from the detected vehicle speed V and the detected steering angle θh only, or from the detected lateral acceleration Gy only.

In the above-described embodiment, by use of the actual current detection sensor 26a for detecting the actual current Im flowing through the electric motor 15, determination as to whether the absolute value Of the difference between the calculated target current I* and the detected actual current Im(=|I*−Im|) has become smaller than a predetermined value is performed so as to detect the end of the control of increasing the target current I*. However, additionally or alternatively, the end of the control of increasing the target current I* may be detected based on the fact that the absolute value Of the difference between the rotational angle θm of the rotor of the electric motor 15 detected by the motor rotational angle sensor 24 and the target rotational angle of the rotor of the electric motor 15 calculated on the basis of the target motor torque Tm*. Further, by use of a torque sensor for detecting the output torque of the electric motor 15, the end of the control of increasing the target current I* may be detected based on the fact that the absolute value Of the difference between the detected output torque of the electric motor 15 and the target motor torque Tm*.

What is claimed is:

1. A stabilizer apparatus for a vehicle comprising:
    a divided stabilizer having two sections;
    a motor-driven actuator composed of an electric motor and a speed reduction mechanism and disposed between the two sections of the stabilizer so as to rotate one section of the stabilizer in relation to the other section thereof about an axis of the stabilizer;
    target current determination means for determining a target current which must flow through the electric motor in order to suppress a roll of the vehicle;
    current control means for increasing and decreasing the current flowing through the electric motor such that the determined target current flows through the electric motor;
    current increase control end detection means for detecting when the control for increasing the current flowing through the electric motor ends; and
    current decreasing control means for decreasing the current flowing through the electric motor by a predetermined amount in response to detection of the end of the current increasing control by the current increase control end detection means.

2. A stabilizer apparatus for a vehicle according to claim 1, wherein the predetermined amount is equal to the difference between the determined target current at the time of the detection of the end of the current increasing control by the current increase control end detection means and current which is necessary to obtain, during control of decreasing the current flowing through the electric motor, an output torque equal to the output torque of the speed reduction mechanism obtained as a result of the determined target current flowing through the electric motor.

3. A stabilizer apparatus for a vehicle according to claim 1, wherein the current increase control end detection means comprises:
    actual current detection means for detecting actual current flowing through the electric motor; and
    current coincidence detection means for detecting that a difference between the determined target current and the detected actual current becomes smaller than a predetermined value when the control of increasing the current flowing through the electric motor is performed.

4. A stabilizer apparatus for a vehicle according to claim 3, wherein the current increase control end detection means further comprises:
    rotational direction detection means for detecting a rotational direction of the electric motor; and
    increase control state detection means for detecting that the control of increasing the current flowing through the electric motor is performed when the electric motor rotates in a rotational direction corresponding to a direction of the current flowing through the electric motor.

5. A stabilizer apparatus for a vehicle according to claim 4, wherein the predetermined amount is equal to the difference between the determined target current at the time of the detection of the end of the current increasing control by the current increase control end detection means and current which is necessary to obtain, during control of decreasing the current flowing through the electric motor, an output torque equal to the output torque of the speed reduction mechanism obtained as a result of the determined target current flowing through the electric motor.

6. A stabilizer apparatus for a vehicle according to claim 1, wherein the target current determination means comprises:
   target roll angle calculation means for calculating a target roll angle of the vehicle; and
   target current calculation means for calculating the current which must flow through the electric motor such that the calculated target roll angle becomes smaller and determining the calculated current as the target current.

7. A stabilizer apparatus for a vehicle according to claim 1, wherein the target current determination means comprises:
   a vehicle speed sensor for detecting vehicle speed;
   a steering angle sensor for detecting a steering angle of a steering wheel;
   a lateral acceleration sensor for detecting lateral acceleration of the vehicle;
   lateral acceleration estimation means for estimating lateral acceleration of the vehicle in accordance with the detected vehicle speed and the detected steering angle;
   target lateral acceleration calculation means for calculating target lateral acceleration of the vehicle in accordance with the detected lateral acceleration and the estimated lateral acceleration;
   target roll angle calculation means for calculating the target roll angle of the vehicle by using the calculated target lateral acceleration; and
   target current calculation means for calculating the current which must flow through the electric motor such that the calculated target roll angle becomes smaller and determining the calculated current as the target current.

* * * * *